May 5, 1931.  W. MÄRTENS  1,804,105
MAGNIFYING GLASS
Filed April 3, 1928
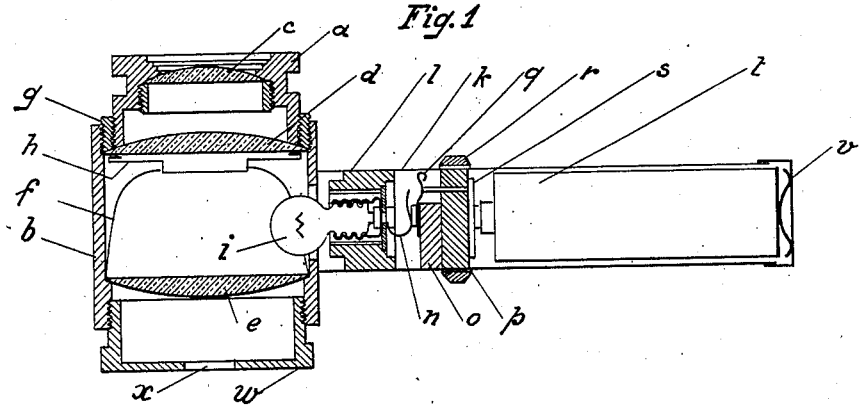
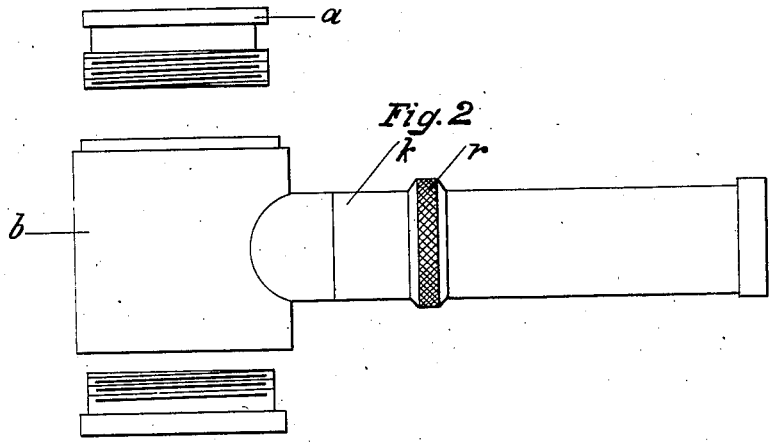
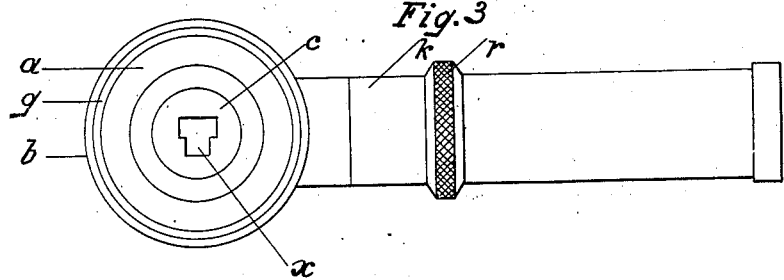
Inventor
Wilhelm Märtens
By B. Singer, atty Patented May 5, 1931

1,804,105

UNITED STATES PATENT OFFICE

WILHELM MÄRTENS, OF BREMEN, GERMANY

MAGNIFYING GLASS

Application filed April 3, 1928, Serial No. 267,020, and in Germany April 5, 1927.

Lenses with electric light arrangements are known wherein the electric lighting source is placed between the lenses, and which are also equipped with a mirror, intended to project the infalling light on the object to be examined.

According to the present invention the mirror is a conical, annular mirror which is placed, according to similar arrangements, referring to microscopes of any kind, between the lenses of the optical instrument. In the present case the mirror acts simultaneously like a diaphragm. Owing to this arrangement an entire illuminating effect of the object is obtained.

The instrument is especially utilized for the examination applied to medical, criminal, philatelic appliances and further for the examination of metals, tools, falsifications of bank-notes, coins, stamps, signatures and in connection with a thread controlling device in the textile industry. A third supplemental lens procures a better magnifying effect. The thread controlling device can be easily placed into the lower part of the tube of the lens.

In the accompanying drawings:

Fig. 1 is a longitudinal section of the instrument;

Fig. 2 is a side view, and

Fig. 3 a plan view of the instrument.

The optical arrangement of the pocket lens comprises substantially a tube $a$, the magnifying or increasing lenses $c$, $d$ and $e$, a conical cap $f$, acting like a reflector on which is placed the diaphragm $h$; $g$ is the closing ring for the tube $b$, $i$ is an electric glow lamp, $k$ a metallic tube serving as a handle; $l$ designates a metallic guiding ring for the glow-lamp fittings, $n$ a contact spring, $o$ an insulating plate on which is fixed a contact spring $q$. $r$ is again a rotatable outer contact ring connected with the insulating plate $p$; $s$ is a metallic plate having a contact pin, $t$ an electric battery, $v$ a clamping spring. $w$ is the thread controlling device with the opening $x$.

The function is as follows:

By the rotation of the contact ring $r$, the contact pin of the plate $s$ is brought into contact with the contact spring $q$ so that the lamp $i$ is illuminated. Its light enters through the lateral opening of the cap and is reflected by the reflecting mirror $f$ on the object to be examined. The rays traverse the lens $e$.

I claim:

1. A magnifying glass having two lenses spaced apart, a conical annular reflector arranged between the lenses and having an opening in one side, and an electric lamp having a bulb projecting partly into the reflector through said opening so that the rays of light from the lamp are projected through the lenses onto the article to be viewed.

2. A magnifying glass as claimed in claim 1, including also a tube in which the said lenses and reflector are arranged, a controlling element having a central opening, said controlling element being threaded in the lower end of the tube and an eye tube connected to the upper end of the tube and having a lens.

In testimony whereof I have hereunto set my hand this 23rd day of February, A. D. 1928.

WILHELM MÄRTENS.